United States Patent [19]

Kuze et al.

[11] Patent Number: 4,693,932
[45] Date of Patent: Sep. 15, 1987

[54] ORIENTED POLYESTER FILM

[75] Inventors: Katsuaki Kuze, Ohtsu; Yasuhiro Nishino, Tsuruga; Yujiro Matsuyama, Ohtsu; Kozo Maeda, Takatsuki; Masahiro Kobayashi, Kyoto; Tadashi Okudaira, Tsuruga; Tsuyoshi Hongo, Ohtsu; Osamu Makimura, Ogaki, all of Japan

[73] Assignee: Toyo Boseki Kabushiki Kaisha, Japan

[21] Appl. No.: 858,878

[22] Filed: May 2, 1986

Related U.S. Application Data

[63] Continuation of Ser. No. 699,298, Feb. 7, 1985, abandoned.

[30] Foreign Application Priority Data

Feb. 9, 1984 [JP]  Japan ................................. 59-023567

[51] Int. Cl.⁴ ............................................. G11B 5/708
[52] U.S. Cl. .................................... 428/323; 428/329; 428/330; 428/331; 428/480; 428/694; 428/900; 428/910; 524/605; 524/425; 523/220
[58] Field of Search ............... 428/480, 694, 329, 323, 428/330, 331, 900, 910, 64, 65; 524/496, 605, 425; 528/486, 491, 302; 523/220

[56] References Cited

U.S. PATENT DOCUMENTS

| | | | |
|---|---|---|---|
| 3,790,435 | 2/1974 | Tanba | 428/330 |
| 3,821,156 | 6/1974 | Farrar | 524/425 |
| 3,980,611 | 9/1976 | Anderson | 428/220 |
| 4,138,386 | 2/1979 | Motegi | 528/130 |
| 4,198,458 | 4/1980 | Mitsuishi | 428/480 |
| 4,242,396 | 12/1980 | Wilson | 428/480 |
| 4,348,446 | 9/1982 | Mitsuishi | 428/694 |
| 4,375,494 | 3/1983 | Stokes | 428/323 |

Primary Examiner—Ellis P. Robinson
Attorney, Agent, or Firm—Jones, Tullar & Cooper

[57] ABSTRACT

An oriented polyester film comprising ethylene terephthalate as the major repeating units, which comprises 0.01 to 1.0% by weight of silica particles and/or titanium dioxide particles having each an average particle size of 0.01 to 0.5µ and 0.005 to 1.0% by weight of calcium carbonate having an average particle size of 0.01 to 0.5µ, which provides an oriented polyester film for the base film of video tape which has a flatness on the surface and has excellent slipperiness, abrasion resistance and running characteristics as well as excellent magnetic transducer characteristics.

17 Claims, 1 Drawing Figure

ORIENTED POLYESTER FILM

This is a continuation of application Ser. No. 699,298, filed on Feb. 7, 1985, now abandoned.

FIELD OF THE INVENTION

The present invention relates to an oriented polyester film containing inorganic particles. More particularly, it relates to an oriented polyester film which is excellent in flatness, slipperiness, running characteristics, abrasion resistance, etc.

BACKGROUND OF THE INVENTION

In general, polyesters such as polyethylene terephthalate are excellent in various physical and chemical characteristics, and hence, they are used in various applications, for instance, fibers, moldings and films such as base films for a magnetic recording tape, floppy disc, photography, condenser, packaging, roentgen film, micro film and the like. In such uses, polyester films are required to be sufficient in slipperiness, abrasion resistance, etc., because these properties afford a serious influence on the workability in film production and processing for various applications, and the quality of the produced films.

Particularly, when a polyester film is used for manufacture of a magnetic recording tape, friction and abrasion are remarkable between the film surface and a coating roller on application of a magnetic coating composition onto the film surface, which result in production of wrinkles and scuff marks on the film surface. Further, the resultant magnetic recording tapes, which are used for audio tapes, video tapes, computer tapes and the like by slitting a film coated with magnetic coating composition, move slidably in close contact with many guide rolls, a reproduction head, etc. Thus, friction and abrasion therefrom are so great that scuff marks and strain on the film are readily produced during winding off and winding up by reel or cassette. In some cases, the film surface is scraped off to afford white powders and these may cause production of drop-out, which is the lack of magnetic recording signals.

Further, when a polyester film is used repeatedly as a magnetic recording tape, the running characteristics thereof are deteriorated by an increase of the friction coefficient between the tape and metallic guide rollers or the like with the number of running times. Then, in an extreme case, the guide rollers roll in the tape, or voice (sound) is caused between the tape and reproduction head or guide rollers.

In order to improve the running characteristics such as slipperiness, abrasion resistance and durability of a polyester film, a number of minute concaves and convexs are formed at the surface of the film so as to decrease the contact area of the film with the guide rolls etc. Formation of said concaves and convexs may be accomplished, for instance, by a procedure wherein insoluble particles are separated out from the catalyst residue as a result of polymerization, a procedure wherein inactive inorganic particles are incorporated into the polymeric material, etc.

Usually, particles having a larger particle size produce higher enhancement of slipperiness. In case of a magnetic recording tape, particularly precision films such as video film, however, particles of larger size in the film afford larger projections or concaves and convexs in the magnetic layer, and spacing loss is produced between the magnetic recording tape and a magnetic recording head during running, whereby the lack of magnetic signals, i.e. drop-out, results. It is thus desired that the size of particles in the film is decreased so as to make the concaves and convexes on the surface of the film as minute as possible. Thus there arises an antipodal requirement with a recording tape.

In particular, a magnetic recording tape, which needs a high S/N ratio, such as video tapes of the metal coating type and the vacuum evaporation type, has a remarkably thin magnetic layer, and hence, a shape on the surface of the base film employed directly appears as that of a magnetic layer. Thus, when the flatness of the base film is low, magnetic transducer characteristics of video tapes produced by coating or vacuum evaporation of magnetic composition therefrom are remarkably inferior. Therefore, in such applications, the flatness is particularly required without failure of slipperiness and abrasion resistance.

SUMMARY OF THE INVENTION

It is an object of the present invention to provide an oriented polyester film, particularly, for the base film of video tape, which has flatness on its surface and has excellent slipperiness, abrasion resistance and running characteristics as well as excellent magnetic transducer characteristics. Other objects and advantages of the invention will be apparent to those skilled in the art from the following description.

According to the present invention, there is provided an oriented polyester film comprising a polyester composed of ethylene terephthalate as the major repeating units, (I) 0.01 to 1.0% by weight of particles selected from the group consisting of silica particles and titanium dioxide particles having each an average particle size of 0.01 to $0.5\mu$, and (II) 0.005 to 1.0% by weight of calcium carbonate particles having an average particle size of 0.01 to $0.5\mu$.

The oriented polyester film of the present invention is excellent in flatness and magnetic transducer characteristics of a magnetic recording medium therefrom, as well as slipperiness and abrasion resistance so that production of scuff marks and white powders is markedly suppressed. Thus, the present oriented polyester film has remarkably excellent running characteristics on repeated running.

It is an essential feature of the oriented film of the present invention that at least two particular kinds of particles having specific particle size are incorporated in a specific amount thereto. That is, only when a specific amount of silica and/or titanium dioxide having particular particle size and a specific amount of calcium carbonate particles having particular particle size are present together in the film, has there been found remarkably excellent effectiveness which is never accomplished by using said either particular particles alone or by other particles.

DETAILED DESCRIPTION OF THE INVENTION

Figure 1:
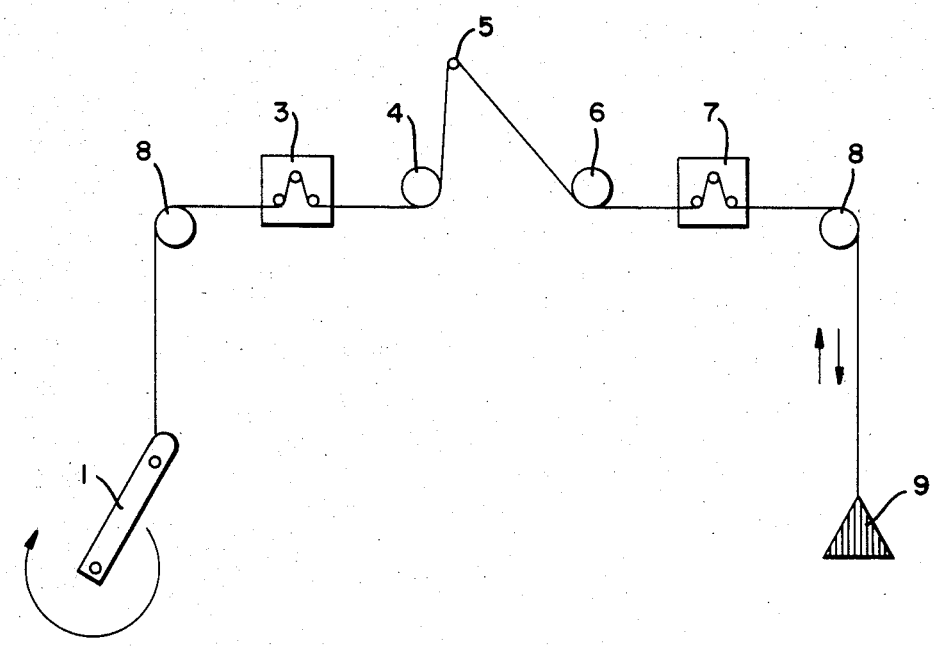
FIG. 1 shows an equipment for measuring repeated running characteristics.

The polyester constituting the film of the present invention may comprise crystalline polyesters such as polyethylene terephthalate, polyalkylene terephthalate and the like, preferably, but not to limit, polyethylene terephthalate, in particular, as a repeating unit not less than 80% by mole of ethylene terephthalate and as the optional repeating unit at least one of dicarboxylic acid components such as isophthalic acid, p-β-oxyethoxybenzoic acid, 2,6-naphthalenedicarboxylic acid, diphenyl-4,4'-dicarboxylic acid, 4,4'-dicarboxybenzophenone, bis(4-carboxyphenyl)ethane, adipic acid, sebacic acid, 5-sodium sulfoisophthalic acid, cyclohexane-1,4-dicarboxylic acid and the like; glycol components such as propylene glycol, butanediol, neopentyl glycol, diethylene glycol, cyclohexane dimethanol, ethyleneoxide adduct of bisphenol A, polyethylene glycol, polypropylene glycol, polytetramethylene glycol and the like; and oxycarboxylic acid components such as p-oxybenzoic acid and the like. In addition, the polyester used in the present invention also may include as copolymerizable components a small amount of the compound which contains amide bond, urethane bond, ether bond, carbonate bond or the like.

The polyester used in the present invention can be produced by any conventional method, such as direct polymerization wherein an aromatic dicarboxylic acid is directly reacted with glycol, and an ester exchanging method wherein dimethyl ester of aromatic dicarboxylic acid is subjected to ester exchanging reaction with glycol. The film may be either uniaxially oriented or biaxially oriented. Usually, a biaxially oriented film is particularly favorable.

Inorganic particles used in the invention may include any silica, titanium dioxide and calcium carbonate particles with no limitation by the method therethrough insofar as their average particle size is as defined in the present invention. Further, the average particle size and the amount of each particle may be employed independently insofar as the conditions are as defined above. The polyester film can employ any calcium carbonate such as natural calcium carbonate and synthetic calcium carbonate. Examples of the calcium carbonate are heavy-duty calcium carbonate, light-duty calcium carbonate, colloidal calcium carbonate, etc. These particles may be optionally treated onto the surface. Further, they may be incorporated with a dispersing aid and/or a coagulation inhibitor, when desired.

Further, the crystal form of each particles has no specific limitation, but each particle preferably has a volume shape factor within the range of 0.08 to $\pi/6$. The volume shape factor is calculated as follows:

$$f = v/D^3$$

wherein, v is volume of particles ($\mu m^3$) and D is maximum diameter ($\mu m$) on projected plan. The volume shape factor means the degree of sphere, where the factor is closer to $\pi/6$, the shape is closer to bulk or sphere.

The average particle size of silica and titanium dioxide, which are the first inorganic particle components incorporated in the present invention is within a range of 0.01 to 0.5$\mu$, preferably of 0.01 to 0.4$\mu$, more preferably of 0.01 to 0.3$\mu$. Particularly, in an application wherein remarkable flatness is required, such as metal coating type and vacuum evaporation type video tape, these particle sizes are within a range of 0.01 to 0.1$\mu$. When the particle size is less than 0.01$\mu$, slipperiness, abrasion resistance and running durability is unfavorably deteriorated. On the other hand, in case of more than 0.5$\mu$, the flatness at the surface is not sufficient for a magnetic recording tape, particularly a video tape. In addition, the number of coarse particles, which cause drop-out, is increased, and the magnetic transducer characteristics is deteriorated.

Such first component is incorporated in a range of 0.01 to 1.0% by weight based on the weight of the polyester, preferably 0.02 to 0.6% by weight, more preferably 0.05 to 0.5% by weight. Particularly, in an application wherein remarkable flatness is required, such content is 0.05 to 0.3% by weight. When the content is less than 0.01% by weight, it is unfavorable that the slipperiness, abrasion resistance and running durability is remarkably deteriorated. On the other hand, in the case of more than 1.0% by weight, the flatness at the surface is not sufficient for a magnetic recording tape, particularly a video tape, and the number of coarse particles are unfavorably increased to deteriorate magnetic transducer characteristics.

Then, the average particle size of the second component calcium carbonate is within a range of 0.01 to 0.5$\mu$, preferably 0.03 to 0.49$\mu$, more preferably 0.04 to 0.48$\mu$. In an application wherein the running durability and abrasion resistance is specifically required, such particle size is within a range of 0.1 to 0.48$\mu$. To the contrary, in an application wherein remarkable flatness is specifically required, such particles size is within a range of 0.04 to 0.1$\mu$. When such particle size is less than 0.01$\mu$, the slipperiness, abrasion resistance and running durability are unfavorably deteriorated. On the other hand, in the case of more than 0.5$\mu$, the flatness at the surface is insufficient. In addition, the number of coarse particles, which cause drop-out, is increased, and the magnetic transducer characteristics is unfavorably deteriorated.

The second component calcium carbonate is incorporated within a range of 0.005 to 1.0% by weight based on the weight of the polyester, preferably 0.01 to 0.6% by weight, more preferably 0.02 to 0.5% by weight. Particularly, in an application such as a metal coating type and vacuum evaporation type video tape wherein remarkable flatness is required, such content is 0.02 to 0.2% by weight. When the content is less than 0.005% by weight, it is unfavorable that the slipperiness, abrasion resistance and running durability are remarkably deteriorated. On the other hand, the content is more then 1.0% by weight, the flatness at the surface is insufficient for magnetic recording tape, particularly video type. In addition, the number of coarse particles, which cause drop-out, is increased, and electromagnetic transducer characteristics is unfavorably deteriorated.

The average particle size of calcium carbonate particles may be larger or smaller than that of silica or titanium dioxide. However, it is preferred that the average particle size of calcium carbonate is larger than those of silica and titanium dioxide The term "average particle size" as herein used is intended to mean the particle size of the equivalent spherical particle size distribution as calculated according to the Stokes' formula at 50% integration.

For obtaining the above desired average particle size, such inorganic material as commercially available may be pulverized by a per se conventional procedure to make uniform powders, optionally followed by sieving, classification, centrifugation, etc.

According to the present invention, the fine particles may be incorporated into a polyester, of which the oriented film is made, at any stage in the manufacture of the polyester or its film, and it is particularly preferred to carry out the incorporation prior to completion of the initial condensation. In the incorporation, the inorganic fine particles may be in a slurry state or a powdery state. For prevention of fly as well as enhancement of supply precision or uniformity, the incorporation in a slurry state, preferably in a slurry of ethylene glycol is favored. On preparing the slurry, a uniform dispersion is required so as to reproduce the original primary particles as much as possible.

When the particles are incorporated in the slurry state, the particle having the particle size of not less than 5μ is preferably 0.5% by weight or less based on the weight of whole particles so that the coarse particle is decreased.

On incorporation of the particles in the slurry state, a slurry containing silica and titanium dioxide, and a slurry containing calcium carbonate may be incorporated into the polyester separately or simultaneously. When simultaneously, they may be incorporated through separate inlets. Both slurries may be admixed uniformly prior to being added into the reaction system for manufacture of the polyester. In addition, it may be employed that the polyester containing the particles in high concentration without coagulation is prepared followed by adjusting to the desired concentration of particles.

The polyester may contain inner particles, i.e. fine particles separated out in the course of its manufacture, insofar as the content and particle size of the inner particles do not result in increase of the number of coarse particles and do not deteriorate the flatness at the surface.

When the tape is used in the application where only one side thereof contacts metallic rollers, only the contact side may contain the above inert inorganic particles and the other side may contain other appropriate inert inorganic particles or may be other layer without particles dependent upon its applications.

Except said incorporation of silica and/or titanium dioxide and calcium carbonate, the production of the polyester and the manufacture of the film may be accomplished by per se conventional procedures. Stretching of the resulting film may be also accomplished by per se conventional procedures.

The resulting oriented film of the present invention is suitable for preparation of a film usable in various fields including electrical field, photographic field such as a micro film, base film for vacuum evaporation type film, etc. It is preferred for the manufacture of a magnetic recording base, particularly a base of magnetic recording tape, more particularly a base of video tape.

Practical and presently preferred embodiments of the invention are illustratively shown in the following Examples wherein % and part(s) are by weight unless otherwise indicated.

Measurement of the physical properties was carried out in the following manners:

(1) Processability of film

A rolled tape made by cutting the test film in a small width was run in contact with a metallic guide roll at a high speed for a long time. The tape tension after passing through the guide roll (slipperiness) and the amount of white powders produced at the surface of the guide roll (abrasion resistance) were evaluated on the following criteria.

Slipperiness:

| Grade | |
|---|---|
| 1 | Large tension (many scuff marks) |
| 2 | Slightly large tension (considerable scuff marks) |
| 3 | Moderate tension (slight scuff marks) |
| 4 | Slightly small tension (no material scuff mark) |
| 5 | Small tension (no scuff mark) |

Abrasion resistance:

| Grade | |
|---|---|
| 1 | Large amount of white powders |
| 2 | Considerable amount of white powders |
| 3 | Slight amount of white powders |
| 4 | No material amount of white powders |
| 5 | None |

(2) Running resistance (Repeated running characteristics)

The running resistance was measured by using the equipment shown in FIG. 1 of the accompanying drawing, wherein 1 indicates a crank; 2, 4, 6 and 8 indicate free rolls; 3 and 7 indicate tension detectors; 9 indicates a load; and 5 indicates a commercially available guide pin.

The test polyester film was run under atmosphere at a temperature of 23° C. and a relative humidity of 65%; in the condition that the coarse side of the film was in contact with a guide pin of commercially available household video recorder at an angle of $\frac{3}{4}$ π(radian). The guide pin has the maximum peak to valley roughness of 15 and an average roughness at the center line of 0.08 by measurement with a contact finger type apparatus for measurement of surface roughness. The reciprocating running was carried out at 100 times under 50 g weight of a constant tension and 8.0 rpm of an angular velocity of the crank. The increase of the coefficient of static and dynamic friction after running from an initial value ($\Delta\mu ks$, $\Delta\mu kd$) was evaluated on the following criteria.

Increase of coefficient of static and dynamic friction:

| Grade | |
|---|---|
| 1 | 0.20 or more |
| 2 | 0.15–0.20 |
| 3 | 0.10–0.15 |
| 4 | 0.05–0.10 |
| 5 | less than 0.05 |

(3) Average particle size

By the use of a centrifugation type apparatus for measurement of particle size distribution (manufactured by Shimadzu Seisakusho), the equivalent spherical particle size distribution was determined, and the value at 50% integration was taken as the average particle size.

(4) Surface flatness of film (TAR)

Using a contact finger type apparatus for measurement of three dimensional surface roughness (SE-3AK; Kosaka Kenkyusho Company), the heights for quantitization width of 0.00312μ were read into outer memory unit under the following conditions: radius of needle, 2μ; load weight, 70 mg; cut off on length of film, 0.25 mm; standard length of measurement, 1 mm; distance of measurement point, 2μ. Such measurement was carried out every 2μ at in crosswise direction of film successively at 150 times (measuring over 0.3 mm on crosswise direction of a film). The TAR (three dimensional average roughness; micron) is calculated by following formula:

$$TAR = \frac{1}{75000} \sum_{i=1}^{500} \sum_{j=1}^{150} \Delta h(i,j) \quad (I)$$

$$\Delta h(i,j) = \left| h(i,j) - \frac{1}{75000} \sum_{i=1}^{500} \sum_{j=1}^{150} h(i,j) \right| \quad (II)$$

wherein $h(i,j)[i=1$ to $500, j=1$ to $150]$ is a data on the direction of the height.

(5) Number of coarse particles

A small amount of the test film was interposed between two cover glasses and melt-pressed at 280° C. Immediately after cooling, observation was made by the use of a phase contrast microscope, and the number of particles having a maximum size of not less than 5μ (the number of measuring area of 4.8 mm²) within the visible field was counted by the aid of an image analyzer "Luzex 500" manufactured by Nippon Refulator K.K. The particle number was evaluated on the basis of the following criteria:

| Grade | |
|---|---|
| 1 | 51 or more particles/4.8 mm² |
| 2 | 21-50 particles/4.8 mm² |
| 3 | 11-20 particles/4.8 mm² |
| 4 | 4-10 particles/4.8 mm² |
| 5 | 0-3 particles/4.8 mm² |

(6) Electromagnetic transduce characteristics (S/N ratio)

The resulting film was made into a magnetic recording tape. The signal of 50% white level was measured at an optimum recording current for each recording tapes. The ratio of signal to noise (S/N) in video demodulation signals on regeneration was measured by a video noise measuring apparatus. The S/N ratio were evaluated in comparison with a commercially available standard video tape on the following criteria:
S/N ratio:

| Grade | |
|---|---|
| 1 | small |
| 2 | slightly small |
| 3 | equivalent to commercially available magnetic record:ng tape |
| 4 | slightly great |
| 5 | great |

EXAMPLE 1

Firstly, the esterification was carried out by using of a reaction apparatus for continuous esterification comprising two stages of complete mixing tanks equipped each with a stirrer, a condenser, an inlet for supply and an outlet for discharge.

A slurry of terephthalic acid in ethylene glycol having a molar ratio of ethylene glycol/terephthalic acid of 1.7 and containing antimony trioxide (289 ppm in terms of antimony atom per each terephthalic acid unit) was supplied continuously to the system of the esterification product in the first mixing tank for the first esterification. Simultaneously, from the separate inlet for terephthalic acid, a solution of magnesium acetate tetrahydrate in ethylene glycol and a solution of sodium acetate in ethylene glycol were continuously supplied thereto respectively at rates of 100 ppm (in terms of Mg atom) and of 10 ppm (in terms of Na atom) per each polyester unit in the reaction mixture passing through said mixing tank. The reaction was carried out at a temperature of 255° C. under atmospheric pressure with an average retention time of 4.5 hours.

The reaction mixture was continuously discharged from the first mixing tank and then supplied to the second mixing tank for the second mixing tank for the second esterification. Ethylene glycol (0.5 part), an ethylene glycol solution of trimethyl phosphate (64 ppm in terms of P), an ethylene glycol slurry containing silica (average particle size, 0.04μ; 0.25% based on the weight of the polymer) and an ethylene glycol slurry containing calcium carbonate (average particle size, 0.08μ; 0.15% based on the weight of the polymer) per each polyester unit in the reaction mixture passing through the second mixing tank were continuously supplied thereto from separate inlets respectively. The reaction was carried out at a temperature of 260° C. under atmospheric pressure with an average retention time of 5.0 hours.

Then, the polycondensation of the mixture was carried out by feeding the resulting esterification product continuously into a two stage reaction apparatus for continuous polycondensation equipped with a stirrer, a condenser, an inlet for charge and an outlet for discharge, to give a polyester having a intrinsic viscosity of 0.620.

The polyester thus produced was melt-extruded at a temperature of 290° C. and the resulting film was stretched at 90° C. with a stretch ratio of 3.5 in machine direction 130 and at 130° C. with a stretch ratio of 3.5 in the transverse direction, followed by heat treatment at 220° C. to obtain an oriented film of 15μ in thickness. The physical characteristics of the oriented film are shown in Table 1, from which it is understood that the oriented polyester film is satisfactory in all the characteristics including flatness at the surface, slipperiness, abrasion resistance, running characteristics and a small number of coarse particles, and remarkably excellent electromagnetic transducer characteristics.

EXAMPLE 2

In the same manner as in Example 1 but changing the amount and average particle size of calcium carbonate as in Table 1, the oriented film was prepared. The physical characteristics are also shown in Table 1. From the results, it is understood that the oriented films of the present invention are remarkably excellent in all the characteristics.

REFERENCE EXAMPLE 1 AND 2

In the same manner as in Example 1 but not using calcium carbonate and further changing the amount of silica as in Table 1, the oriented film was prepared. The physical characteristics are also shown in Table 1. As a result, it is understood that the oriented film is remarkably inferior in running resistance, slipperiness and abrasion resistance.

REFERENCE EXAMPLE 3 AND 4

In the same manner as in Example 2 but not using silica and further changing the amount of calcium carbonate as in Table 1, the oriented film was prepared. The physical characteristics are also shown in Table 1. As a result, it is understood that the oriented film is inferior in running resistance.

REFERENCE EXAMPLE 5 AND 6

In the same manner as in Example 2 but changing the average particle size or the amount of silica as in Table 1, the oriented film was prepared. The physical characteristics are also shown in Table 1. As a result, the resulting film is remarkably inferior in number of coarse particles and electromagnetic transducer characteristics.

EXAMPLE 3

In the same manner as in Example 2 but changing the amount of silica and calcium carbonate, the oriented film was prepared. The physical characteristics are also shown in Table 1. As a result, it is understood that the resulting film is remarkably superior in all characteristics.

REFERENCE EXAMPLE 7

In the same manner as in Example 3 but changing the average particle size of silica and calcium carbonate as in Table 1, the oriented film was prepared. The physical characteristics are also shown in Table 1. As a result, the resulting film is remarkably inferior in number of coarse particles and electromagnetic transducer characteristics.

EXAMPLE 4

In the same manner as in Example 1 but changing the average particle size and the amount of silica and the amount of calcium carbonate, the oriented film was prepared. The physical characteristics are also shown in Table 1. As the result, it is understood that the resulting film is remarkably superior in all characteristics.

REFERENCE EXAMPLE 8 AND 9

In the same manner as in Example 4 but changing the average particle size and the amount of silica and calcium carbonate as in Table 1, the oriented film was prepared. The physical characteristics are also shown in Table 1. As a result, the resulting film is remarkably inferior in number of coarse particles and electromagnetic transducer characteristics.

EXAMPLE 5 TO 8

In the same manner as in Example 1 but changing the amount of silica and the average particle size and the amount of calcium carbonate, the oriented film was prepared. The physical characteristics are also shown in Table 1. As a result, it is understood that the resulting film is remarkably superior in all characteristics.

EXAMPLE 9 AND 10

In the same manner as in Example 1 but using titanium dioxide instead of silica and changing the average particle size and the amount of calcium carbonate, the oriented film was prepared. The physical characteristics are also shown in Table 1. As a result, it is understood that the resulting film is remarkably superior in all characteristics.

REFERENCE EXAMPLE 10

In the same manner as in Example 9 but not using calcium carbonate as in Table 1, the oriented film was prepared. The physical characteristics are also shown in Table 1. As a result, it is understood that the resulting film is remarkably inferior in running resistance, slipperiness and abrasion resistance.

EXAMPLE 11

In the same manner as in Example 1 but using three kinds of inorganic particles, titanium dioxide, silica and calcium carbonate as in Table 1, the oriented film was prepared. The physical characteristics are also shown in Table 1. As a result, it is understood that the resulting film is remarkably superior in all characteristics.

TABLE 1

| | Titanium dioxide | | Silica | | Calcium carbonate | | Running characteristics | | | | | | Electromagnetic transducer characteristics (Grade) |
|---|---|---|---|---|---|---|---|---|---|---|---|---|---|
| | | | | | | | Running Resistance | | | Processability | | | |
| | Average particle size ($\mu$) | Amount (wt %) | Average particle size ($\mu$) | Amount (wt %) | Average particle size | Amount (wt %) | ($\Delta\mu ks$) | ($\Delta\mu kd$) | Slipperiness (Grade) | Abrasion resistance (Grade) | Flatness TAR ($\mu$) | Number of course particle (Grade) | |
| Ex. 1 | — | — | 0.04 | 0.25 | 0.08 | 0.15 | 4 | 4 | 4 | 4 | 0.007 | 5 | 5 |
| Ex. 2 | — | — | 0.04 | 0.25 | 0.47 | 0.05 | 5 | 5 | 5 | 5 | 0.011 | 5 | 4 |
| Ref Ex. 1 | — | — | 0.04 | 0.25 | — | — | 1 | 1 | 3 | 3 | 0.005 | 5 | 5 |
| Ref Ex. 2 | — | — | 0.04 | 0.50 | — | — | 2 | 2 | 2 | 2 | 0.006 | 5 | 5 |
| Ref Ex. 3 | — | — | — | — | 0.47 | 0.05 | 3 | 3 | 4 | 4 | 0.008 | 5 | 5 |
| Ref Ex. 4 | — | — | — | — | 0.35 | 0.10 | 3 | 3 | 4 | 4 | 0.008 | 5 | 5 |
| Ref Ex. 5 | — | — | 0.52 | 0.25 | 0.47 | 0.05 | 5 | 5 | 5 | 5 | 0.053 | 1 | 1 |
| Ref Ex. 6 | — | — | 0.04 | 1.20 | 0.47 | 0.05 | 5 | 5 | 5 | 5 | 0.013 | 2 | 2 |
| Ex. 3 | — | — | 0.04 | 0.15 | 0.47 | 0.10 | 5 | 5 | 5 | 5 | 0.010 | 5 | 4 |
| Ref Ex. 7 | — | — | 0.65 | 0.15 | 0.08 | 0.10 | 4 | 4 | 4 | 4 | 0.045 | 1 | 1 |
| Ex. 4 | — | — | 0.08 | 0.20 | 0.08 | 0.20 | 4 | 4 | 4 | 4 | 0.008 | 5 | 5 |
| Ref Ex. 8 | — | — | 0.04 | 1.20 | 0.08 | 0.15 | 4 | 4 | 5 | 4 | 0.012 | 2 | 2 |
| Ref Ex. 9 | — | — | 0.65 | 0.20 | 0.60 | 0.07 | 5 | 5 | 5 | 5 | 0.055 | 1 | 1 |
| Ex. 5 | — | — | 0.04 | 0.50 | 0.35 | 0.07 | 5 | 5 | 5 | 5 | 0.012 | 5 | 4 |
| Ex. 6 | — | — | 0.04 | 0.50 | 0.20 | 0.20 | 5 | 5 | 5 | 5 | 0.011 | 5 | 4 |
| Ex. 7 | — | — | 0.04 | 0.10 | 0.08 | 0.10 | 4 | 4 | 4 | 4 | 0.004 | 5 | 5 |
| Ex. 8 | — | — | 0.04 | 0.25 | 0.15 | 0.15 | 5 | 5 | 5 | 5 | 0.009 | 5 | 4 |
| Ex. 9 | 0.25 | 0.20 | — | — | 0.35 | 0.10 | 5 | 5 | 5 | 5 | 0.013 | 5 | 3 |

TABLE 1-continued

| | Titamium dioxide Average particle size (μ) | Titamium dioxide Amount (wt %) | Silica Average particle size (μ) | Silica Amount (wt %) | Calcium carbonate Average particle size | Calcium carbonate Amount (wt %) | Running characteristics Running Resistance (Δμks) | Running characteristics Running Resistance (Δμkd) | Running characteristics Processability Slipperiness (Grade) | Running characteristics Processability Abrasion resistance (Grade) | Flatness TAR (μ) | Number of course particle (Grade) | Electromagnetic transducer characteristics (Grade) |
|---|---|---|---|---|---|---|---|---|---|---|---|---|---|
| Ex. 10 | 0.03 | 0.20 | — | — | 0.08 | 0.15 | 4 | 4 | 4 | 4 | 0.007 | 5 | 5 |
| Ref Ex. 10 | 0.25 | 0.20 | — | — | — | — | 2 | 2 | 3 | 2 | 0.009 | 5 | 5 |
| Ex. 11 | 0.25 | 0.15 | 0.04 | 0.30 | 0.20 | 0.10 | 5 | 5 | 5 | 5 | 0.012 | 5 | 4 |

What is claimed is:

1. An oriented polyester film for manufacturing a magnetic recording tape which comprises a polyester composed of ethylene terephthalate as the major repeating units, and
   (I) 0.01 to 1.0% by weight of particles selected from the group consisting of silica particles and titanium dioxide particles having each an average particle size of 0.01 to 0.5μ, and
   (II) 0.005 to 1.0% by weight of calcium carbonate particles having an average particle size of 0.01 to 0.5μ, provided that an amount of particles which have a particle size of not less than 5μ is not more than 0.5% by weight based on the total weight of said particles of (I) and (II) when they are incorporated in a slurry state.

2. An oriented polyester film according to claim 1, wherein each silica and titanium dioxide particle has an average particle size of 0.01 to 0.4μ.

3. An oriented polyester film according to claim 1, wherein each silica and titanium dioxide particle has an average particle size of 0.01 to 0.3μ.

4. An oriented polyester film according to claim 1, wherein each silica and titanium dioxide particle has an average particle size of 0.03 to 0.1μ.

5. An oriented polyester film according to claim 1, wherein the silica and titanium dioxide particles are incorporated in an amount of 0.02 to 0.6% by weight.

6. An oriented polyester film according to claim 1, wherein the silica and titanium dioxide particles are incorporated in an amount of 0.05 to 0.5% by weight.

7. An oriented polyester film according to claim 1, wherein the silica and titanium dioxide particles are incorporated in an amount of 0.05 to 0.3% by weight.

8. An oriented polyester film according to claim 1, wherein the calcium carbonate particles have an average particles size of 0.03 to 0.49μ.

9. An oriented polyester film according to claim 1, wherein the calcium carbonate particles have an average particle size of 0.04 to 0.48μ.

10. An oriented polyester film according to claim 1, wherein the calcium carbonate particles have an average particle size of 0.04 to 0.1μ.

11. An oriented polyester film according to claim 1, wherein the calcium carbonate particles have an average particle size of 0.1 to 0.48μ.

12. An oriented polyester film according to claim 1, wherein the calcium carbonate particles are incorporated in an amount of 0.01 to 0.6% by weight.

13. An oriented polyester film according to claim 1, wherein the calcium carbonate particles are incorporated in an amount of 0.02 to 0.5% by weight.

14. An oriented polyester film according to claim 1, wherein the calcium carbonate particles are incorporated in an amount of 0.02 to 0.2% by weight.

15. An oriented polyester film according to claim 1, wherein the average particle size or calcium carobonate is larger than that of silica and titanium dioxide.

16. An oriented polyester film according to claim 1, wherein the film is a biaxially oriented film.

17. An oriented polyester film according to claim 1, wherein the film serves as a base film for a video tape.

* * * * *